July 24, 1962 | I. MOLNAR | 3,046,344

CALLING STATION DETECTOR

Filed Nov. 26, 1958 | 2 Sheets-Sheet 1

INVENTOR.
Imre Molnar

BY

[signature]

Atty.

July 24, 1962 I. MOLNAR 3,046,344

CALLING STATION DETECTOR

Filed Nov. 26, 1958 2 Sheets-Sheet 2

INVENTOR.
Imre Molnar

BY
C. A. Gulbrandsen
Atty.

United States Patent Office 3,046,344
Patented July 24, 1962

3,046,344
CALLING STATION DETECTOR

Imre Molnar, Chicago, Ill., assignor to Automatic Electric Laboratories, Inc., a corporation of Delaware
Filed Nov. 26, 1958, Ser. No. 776,551
4 Claims. (Cl. 179—9)

This invention pertains to automatic toll ticketing telephone systems, particularly to line and party detecting apparatus which permits frequency-per-terminal operation and records given particulars of certain calls processed through the system. More particularly, this invention relates to an improved detector to be used in conjunction with an automatic toll ticketing telephone system of the type disclosed in the copending U.S. application of J.E. Ostline, I. V. Coleman, and J. W. Taugner, Serial No. 628,474, filed December 3, 1956.

The detector in an automatic toll ticketing telephone system is that equipment which automatically senses the directory number of the calling subscriber station making a toll call. This number becomes part of the call record which is automatically recorded by a ticketer at the termination of each completed customer dialled toll call. Earlier detectors were limited in the detection of party line stations, either by the necessity to utilize the frequency-per-hundred terminal group method of operation or the requirement that each station have, associated with its terminal equipment, an electro-mechanical relay peculiar thereto. While the terminal-per-station and frequency-per-hundred terminal group method of providing party station service in automatic exchanges is well-known and widely used, this system is too inflexible to be readily adapted to the movement of party station subscribers within an exchange area. In order to conserve outside plant facilities, a movement of a party line subscriber within an exchange area requires the changing of his directory listed station number. This inflexibility is caused by the inherent drawback of the existing systems which require physical connection of the line terminal to a particular party relay to maintain the same directory number associated with the station. Because of this inflexibility a change of residence of a party station subscriber necessitates a change of that subscriber's directory number and the attendant increase in information equipment necessary and operator requirements, as well as restricting maintenance of balanced connector loads.

The terminal-per-station party service plan with frequency-per-terminal ringing is recognized as the best system for maintaining existing directory listings when party service subscribers move within an exchange and for maintaining efficient distribution of connector traffic in an exchange. In the past it has been necessary to weigh these advantages against the increased cost and space requirements which are attendant upon the inclusion of a relay in the central office equipment for each station. The new and improved detector of this invention permits frequency-per-terminal operation without the inclusion of a relay for each line in the exchange and thereby eliminates the cost and space requirement objections to the use of such a system.

Accordingly, it is the primary object of this invention to provide a telephone system with a new and improved detector which is operable on a frequency-per-terminal basis without electro-mechanical equipment peculiar to each terminal.

Another object of this invention is to provide an automatic toll ticketing telephone system with facilities for reassignment of party line equipment without change in directory number.

Yet another object of this invention is to provide an automatic toll ticketing telephone system with a new and improved detector having reduced space requirements for central office equipment.

These and other objects of this invention will be apparent to one skilled in the art from the following detailed description taken in conjunction with the drawings wherein.

In a system incorporating a detector of this invention, an identifying potential, associated with the calling station, is developed in any well-known manner such as that described in the afore-mentioned co-pending U.S. application, Serial No. 628,474.

Figure 1:
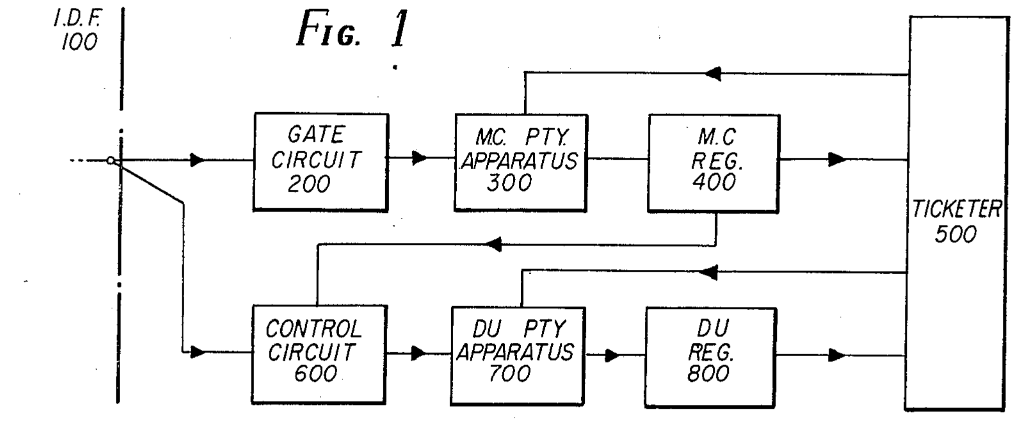
FIG. 1 is a block trunking diagram of a detector embodyng this invention.

The above-mentioned identifying potential is conducted to an intermediate distributing frame (hereinafter referred to as IDF) 100. As is most clearly shown in FIG. 1, identifying potential is extended from the IDF 100 to the calling station detector of this invention which consists of a gate circuit 200, and MC party apparatus 300, an MC register 400, a ticketer 500, a control circuit 600, a DU party apparatus 700, and a DU register 800. The calling station identifying potential is extended from the IDF 100 to the gate circuit 200 which is actuated thereby to establish a circuit connection for extension of the identifying potential to the MC party apparatus 300. The calling stations are grouped on a party designation basis, in the MC party apparatus, and the potential is extended on that basis to the MC register 400 under control of the ticketer 500. In the MC register 400, the potential is converted into ground markings indicative of the first two digits of the calling station directory number which are transmitted to the ticketer 500 for registration therein.

Operation of the MC register 400 also extends ground back to the control circuit 600 to establish a second circuit path from the IDF 100 for extension of the identifying potential to the DU party apparatus 700. This apparatus, like the MC party apparatus 300, is operated on a party line basis by the ticketer 500 to extend the identifying potential to the DU register 800 for operation thereof. Operation of the DU register 800 extends ground markings indicative of the last two digits of the calling station directory to the ticketer 500 for registration therein.

Thus it may be seen that a single identifying potential associated with a calling station is sequentially transmitted to the detector and converted to markings indicative of all four digits of the calling station directory number, which markings are transmitted to the ticketer for recording therein for billing or other purposes.

After all four decimal digits of the calling station directory number are recorded in the ticketer, the ticketer releases over MC and DU party apparatus to break the circuit path between the registers and the intermediate distributing frame terminal associated with the calling station. The detector is thus released and prepared for additional detections of the calling station directory numbers.

Figure 2:
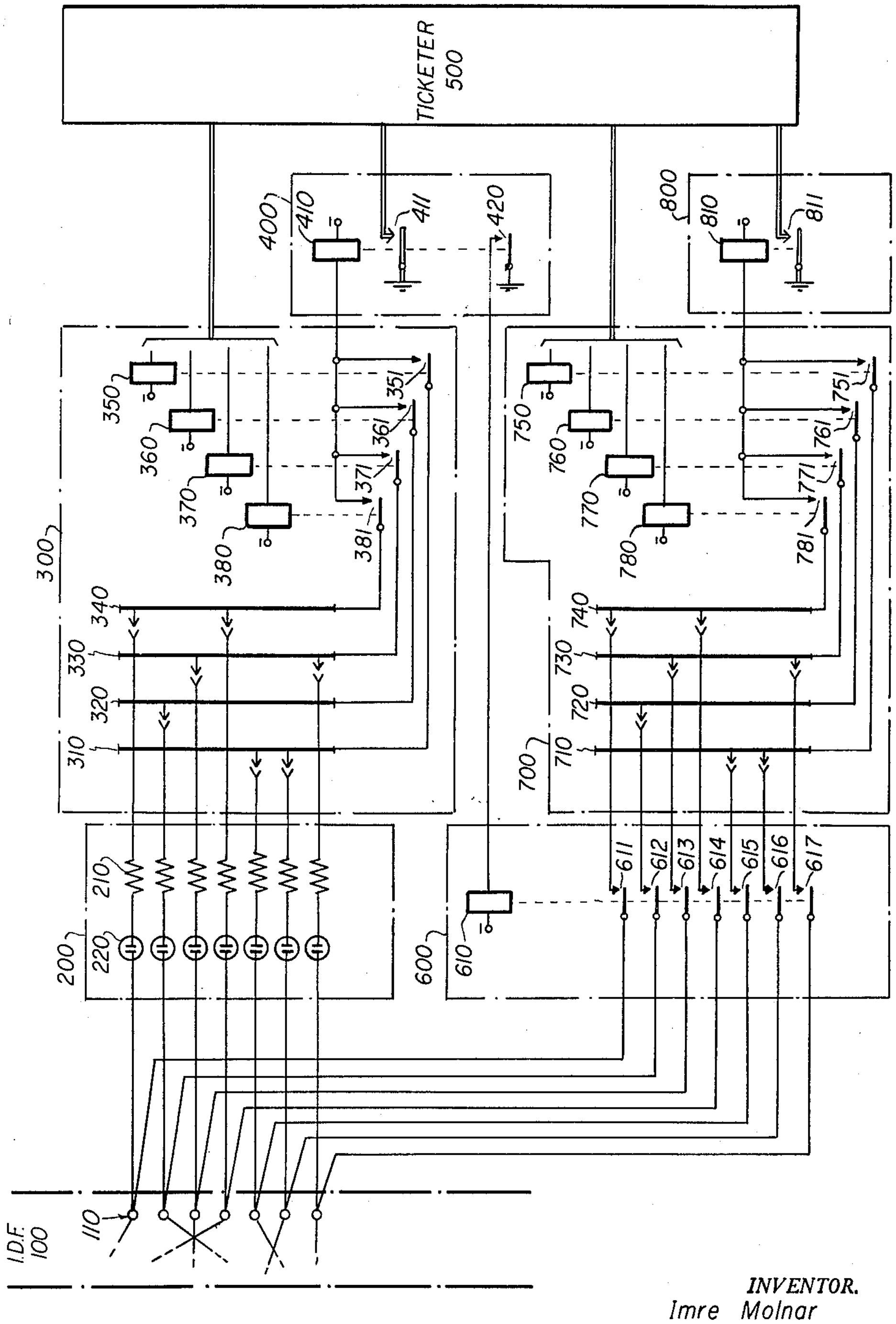
FIG. 2 is a schematic circuit diagram of a detector embodying this invention.

A more thorough understanding of the operation of this invention may be had by reference to FIG. 2 which is a schematic circuit diagram of the calling station detector of this invention. Upon initiation of a call, an identifying potential associated with the calling station is extended to a terminal 110 on the IDF 100. This identifying potential is extended from the IDF to one of the gas filled diodes 220 and an associated resistance 210 that are part of the gate circuit 200. The identifying potential associated with the calling station being of sufficient magnitude, the gas filled diode, by virtue of its characteristics, becomes conductive, and is effective to further extend the identifying potential from the gate circuit 200, to the MC party apparatus 300, and specifically to one of a plurality of MC party bus bars 310, 320, 330, or 340. The identifying potential is further extended from one of the MC party bus bars, to the MC register 400 and particularly to the MC register relay 410. Extension of the identifying potential is made through one of the MC party relay contacts 351, 361, 371 or 381, upon operation of the MC party line relay 350, 360, 370 or 380, associated with the party group of the calling station, by ticketer 500. This ticketer is similar to the ticketer disclosed in the co-pending U.S. application Serial No. 628,474.

Operation of the MC register relay 410 by the identifying potential extends ground over the contacts 411 to the ticketer 500 to transmit markings, on a codel (one or two markings out of four) basis, indicative of the first two decimal digits of the calling station directory number.

The codel combinations and their decimal equivalents are as follows:

| | | | |
|---|---|---|---|
| WX | 1 | XZ | 6 |
| WY | 2 | W | 7 |
| WZ | 3 | X | 8 |
| XY | 4 | Y | 9 |
| XZ | 5 | Z | 0 |

When the MC register relay 410 operates, it also extends operating ground back from the MC register 400 to the control circuit 600 and particularly to the control relay 610. Operation of the control relay closes a second circuit path to extend the calling station identifying potential from the terminal 110 on the IDF 100 over any one of its associated contacts 611 through 617 to one of the party line bus bars 710, 720, 730 or 740 associated with DU party appartus 700. This potential is further extended from one of the party bus bars over one of the DU party relay contacts 751, 761, 771, or 781. As in the case of the MC register, operation by the ticketer, of one of the party relays 750, 760, 770, or 780 associated with the calling station, is necessary to extend the identifying potential over one of the aforementioned relay contacts to the DU register 800. Extension of the identifying potential to the DU register and specifically to the DU register relay 810, is effective to transmit ground markings indicative of the last two decimal digits of the calling station directory number over the DU register relay contacts 811, to the ticketer 500.

Upon the recording of all four decimal digits of the calling station directory number, the ticketer releases the associated MC and DU party relays thereby breaking the circuit path between the registers and the terminal on the IDF to interrupt the sustaining voltage that maintains the circuit through the gas diode and rendering the diode nonconductive. In this manner the detector is released and conditioned for subsequent detection of other calling station directory numbers.

Figure 3:
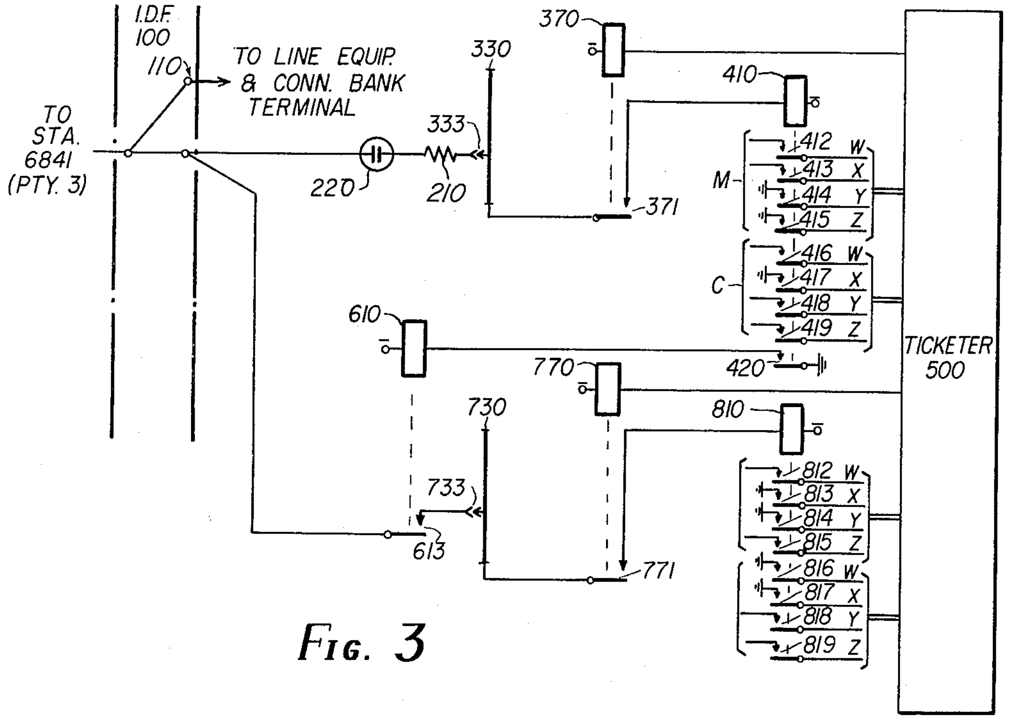
FIG. 3 is a schematic circuit diagram of that portion of the detector equipment of this invention which is associated with a single calling station.

Registration of a specific calling station directory number (6841) may be best understood by reference to FIG. 3 and the following description.

An identifying potential associated with station 6841 which is designated as party 3, is developed in a manner disclosed in the aforementioned application and is transmitted through the associated line equipment to a terminal 110 located on the IDF 100. This potential fires a gas diode 220 to extend the identifying potential through the resistor 210, to a terminal 333 located on the MC party bus bar 330. From the MC party bus bar, the potential is extended through the contacts 371 to the MC register relay 410 employed for registering the first two decimal digits 6 and 8, of the calling station directory number 6841. The party relay contact 371 extends the identifying potential, upon operation of the MC party relay 370. This relay, as previously noted, is operated by the ticketer 500, to extend the identifying potential to the registering relay 410. The register relay 410, upon operation, extends ground over preselected contacts 414, 415, and 417 to the ticketer for marking on a codel basis. A marking indicative of the digit 6 is effected by transmission of ground on leads associated with the characters Y and Z which represent the digit 6 as noted previously. A single ground indicative of the character X is also transmitted to give the appropriate marking for the digit "8." Operation of the MC register relay causes the extension of ground over the contact 420 to the control relay 610 of the control circuit 600.

Operation of the control relay 610 closes a second circuit path to extend the identifying potential associated with station 6841 through the contact 613 of the control relay to the terminals 733 on the DU party bus bar 730. Potential is further extended from the bus bar, through the contacts 771 on the DU party relay 770 to the DU register relay 810 for marking of the third and fourth decimal digits, "4" and "1," of the calling station. Operation of relay 810 of course is dependent upon the closure of the contacts 771 by operation of the DU party relay 770. This relay is operated by the ticketer 500 as previously mentioned. Operation of the relay 810 extends ground over preselected contacts 813 and 814 to give an XY code marking that is symbolic of the digit "4." Ground on the preselected contacts 816 and 817 gives an indication of the codel marking WX which is representative of the final digit, "1," of the calling station number.

Upon registration of all four decimal digits of the calling station number in the ticketer 500, the ticketer releases the MC party relay 370 and the DU party relay 770 breaking the circuit paths carrying the identifying potential associated with the calling station directory number at the party relay contacts 371 and 771. Interruption of the circuit renders the diode 220 non-conductive, thereby releasing the detector for other use.

The embodiment of the invention shown and described herein is but a preferred embodiment thereof; various changes may be made therein without departing from the true spirit or scope of the invention.

What is claimed is:

1. In an automatic toll ticketing telephone system, operable on a frequency-per-terminal basis, having a plurality of stations each having a multi-decimal-digit directory number and a party designation, and an identifying potential applied to each station upon initiation of a call therefrom, a calling station detector comprising: first register means for converting the identifying potential to a plurality of markings representative of the first two decimal digits of a calling station directory number; second register means for converting the identifying potential to a plurality of markings representative of the remaining decimal digits of the calling station directory number; first party means for grouping the stations on the basis of their associated party designations and extending the identifying potential on that basis to the first register means; second party means for grouping the stations on the basis of their associated party designations and extending the identifying potential on that basis to the second register means; potential activated gating means for connecting the identifying potential to the first party means; and control means for extending the identifying potential to the second party means upon operation of the first register means.

2. In an automatic toll ticketing telephone system, operable on a frequency-per-terminal basis, having a plurality of stations each having a multi-decimal-digit directory number and a party designation, and an identifying potential applied to each station upon initiation of a call therefrom, a calling station detector comprising: first register means for converting the identifying potential to a plurality of markings representative of a first two decimal digits of a calling station directory number; second register means for converting the identifying potential to a plurality of markings representative of the remaining decimal digits of the calling station directory number; first party means for grouping the stations on the basis of their associated party designations and extending the identifying potential on that basis to the first register means; second party means for grouping the stations on the basis of their associated party designations and extending the identifying potential on that basis to the second register means; potential activated gating means for connecting the identifying potential to the first party means; control means for extending the identifying potential to the second party means on operation of the first register means; first circuit means for extending the identifying potential to the gating means; and second circuit means for extending the identifying potential to the control means.

3. In an automatic toll ticketing telephone system, operable on a frequency-per-terminal basis, having a plurality of stations, each having a four decimal-digit-directory number and a party designation, and an identifying potential applied to each calling station upon initiation of a call therefrom, a calling station detector comprising: first register means including a plurality of relays for converting the identifying potential to a plurality of markings representative of the first two decimal digits of a calling station directory number; second register means including a plurality of relays for converting the identifying potential to a plurality of markings representative of the last two decimal digits of the calling station directory number; first party means including a plurality of bus bars for grouping the stations on the basis of their associated party designations, and a plurality of relays for extending the identifying potential on that basis to the first register means; second party means including a plurality of bus bars for grouping the stations on the basis of their associated party designations, and a plurality of relays for extending the identifying potential on that basis to the second register means; potential activated gating means, including a plurality of gas-filled diodes for connecting the identifying potential to the first party means; and control means including a plurality of relays for extending the identifying potential to the second party means upon operation of the first register means.

4. In a frequency-per-terminal automatic toll ticketing telephone system, having a plurality of stations, each having a four decimal digit directory number and a party designation, and an identifying potential applied to each station upon initiation of a call therefrom, a calling station detector comprising: first register means including a plurality of relays for converting the identifying potential to a plurality of markings representative of the first two decimal digits of a calling station directory number; second register means including a plurality of relays for converting the identifying potential to a plurality of markings representative of the last two decimal digits of the calling station directory number; first party means including a plurality of bus bars for grouping the stations on the basis of their associated party designations, and a plurality of relays for extending the identifying potential on that basis to the first register means; second party means including a plurality of bus bars for grouping the stations on the basis of their associated party designations, and a plurality of relays for extending the identifying potential on that basis to the second register means; potential activated gating means, including a plurality of gas-filled diodes for connecting the identifying potential to the first party means; control means including a plurality of relays for extending the identifying potential to the second party means upon operation of the first register means; first circuit means including a plurality of conductors for extension of the identifying potential to the gating means; and second circuit means including a plurality of conductors for extending the identifying potential to the control means.

References Cited in the file of this patent

UNITED STATES PATENTS

| | | |
|---|---|---|
| 2,672,515 | Barlow | Mar. 16, 1954 |
| 2,749,387 | Barlow et al. | June 5, 1956 |
| 2,857,470 | Faulkner | Oct. 21, 1958 |